United States Patent [19]

Ambler

[11] Patent Number: 5,417,151
[45] Date of Patent: May 23, 1995

[54] BARBECUE AND METHOD OF MANUFACTURING THE SAME

[75] Inventor: Keith S. Ambler, Moorside, England

[73] Assignee: Kirklees Developments Limited, West Yorkshire, England

[21] Appl. No.: 37,103

[22] Filed: Mar. 26, 1993

[30] Foreign Application Priority Data

Mar. 26, 1992 [GB] United Kingdom ............. 9206630

[51] Int. Cl.6 .................................................. A47J 37/00
[52] U.S. Cl. ........................................ 99/450; 99/482; 126/25 R; 126/9 R
[58] Field of Search ............ 99/450, 482, 449, 446; 126/25 R, 9 R; 72/348

[56] References Cited

U.S. PATENT DOCUMENTS

| 3,440,988 | 4/1969 | Bremer | 72/348 |
|---|---|---|---|
| 3,496,896 | 2/1970 | Smith | 72/348 |
| 3,557,771 | 1/1971 | Koziol | 126/25 R |
| 3,611,911 | 10/1971 | Martin | 99/482 |
| 3,753,396 | 8/1973 | Koziol | 99/482 |
| 3,812,840 | 5/1974 | Whaler | 126/25 R |
| 4,113,095 | 9/1978 | Dietz et al. | 206/508 |
| 4,436,081 | 3/1984 | Hefling | 126/25 A |
| 4,463,746 | 8/1984 | Knuth et al. | 126/25 R |
| 4,503,702 | 3/1985 | Bulso, Jr. et al. | 72/348 |
| 4,738,129 | 4/1988 | Ford | 72/348 |
| 4,788,962 | 12/1988 | Mashburn et al. | 126/25 R |
| 4,979,437 | 12/1990 | Giebel | 99/450 |
| 5,159,917 | 11/1992 | Archer et al. | 126/25 R |

FOREIGN PATENT DOCUMENTS 1135138 9/1980 Canada .
2451181 3/1979 France .

OTHER PUBLICATIONS

European Search Report—Jul. 9, 1993.
UK Search Report—Jul. 8, 1993.

Primary Examiner—Timothy F. Simone
Assistant Examiner—Reginald L. Alexander
Attorney, Agent, or Firm—Nikaido Marmelstein Murray & Oram

[57] ABSTRACT

A bowl 10 and lid 11 of a barbecue are pressed from sheets of steel using press tools (not shown). Surplus steel, which occurs at the corners of the bowl 10 and lid 11 during pressing, is accommodated in elongate channels 14 which project into the bowl 10 and lid 11 and which appear as recesses on the outside of the bowl 10 and lid 11. The channel 14 extends substantially all the way around the undersurface of the bowl 10 but is not of uniform depth all the way around. Instead the depth of the channel 14 is increased at certain points to form shoulders which in use support first and second grill portions which should themselves respectively support portions of food to be cooked and simulated solid fuel.

14 Claims, 1 Drawing Sheet

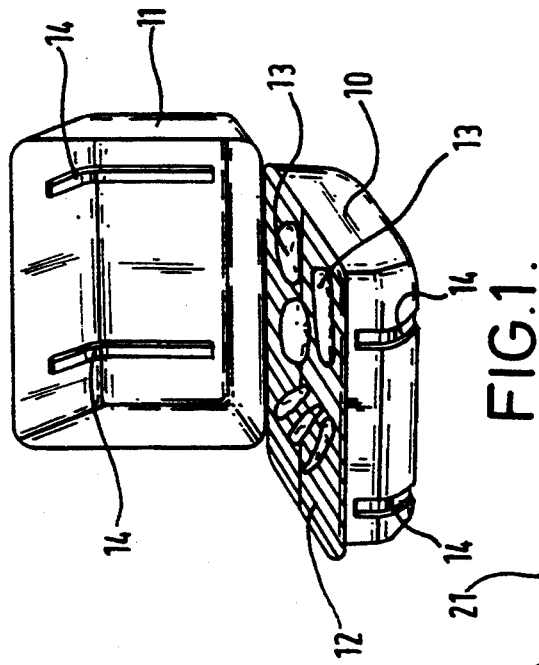
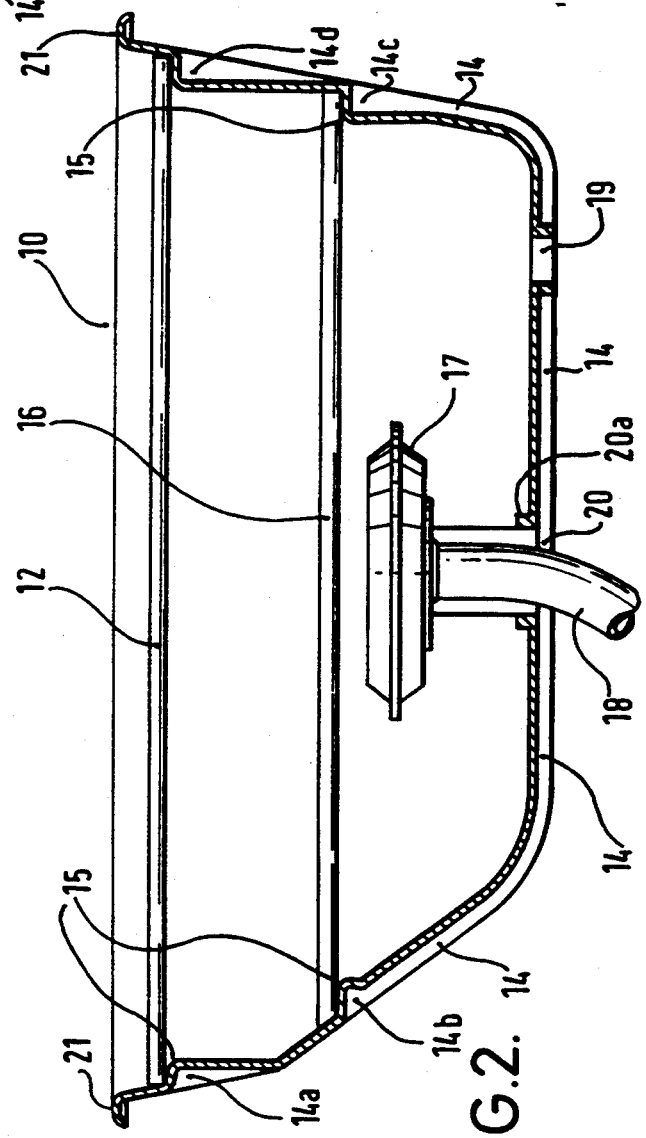

BARBECUE AND METHOD OF MANUFACTURING THE SAME

The present invention relates to a barbecue and to a method of manufacturing the same, and is concerned particularly, although not exclusively, with a gas barbecue and a method of manufacturing the same.

According to a first aspect of the present invention there is provided a barbecue comprising a bowl portion and a first grill portion arranged, in use, to extend at least partly over the bowl portion, the bowl portion comprising a pressing in which at least one first support member is press-formed to support the grill portion.

Preferably the or each support member is arranged to support the grill portion at a location spaced from a base of the bowl portion.

The first grill portion may be arranged to support portions of food to be cooked.

The pressing may be of metal. In a preferred arrangement the pressing comprises a steel pressing.

The bowl portion may comprise a plurality of press-formed first support members arranged in use to be located around the periphery of the first grill portion.

Preferably there is provided at least one second press-formed support member for supporting a second grill portion. The or each second support member is preferably lower in the bowl than the or each first support member.

The second grill portion may be arranged to support portions of fuel or simulated fuel, such as is commonly known as "lava rock".

In a preferred arrangement the barbecue is a gas barbecue, in which at least one gas burner is arranged to be located in a base of the bowl portion to provide heat for cooking portions of food supported on the first grill portion.

Preferably there is provided a lid for the barbecue. The lid may comprise a pressing. Preferably the lid comprises the same or a similar pressing to that of the bowl portion.

In a preferred arrangement the lid and bowl portion are pressed using the same or similar press tools. The bowl portion may be pressed by a press tool having one or more additional portions which portions are not present in the press tool from which the lid is pressed.

Preferably the bowl portion and/or the lid comprises a pressing in which surplus material formed at the corners of the pressing is accommodated in one or more channels in the pressing. At least one support member of the bowl portion may comprise at least one ridge formed in one of the channels.

Preferably the bowl portion has at least one ventilation hole pressed-out therefrom. The or each ventilation hole may have a flange arranged to extend around the hole and to project into the bowl. Alternatively or additionally the bowl portion may be provided with one or more drainage holes, pressed out therefrom.

According to a second aspect of the present invention there is provided a method of manufacturing a barbecue, the barbecue comprising a bowl portion and a first grill portion arranged in use to extend at least partly over the bowl portion, the method comprising pressing out the bowl portion from a blank of material and press-forming in the bowl portion at least one first support member to support the first grill portion.

Preferably the method includes press-forming in the bowl portion at least one first support member to support the first grill portion at a location spaced from a base of the bowl portion.

The method may comprise pressing out a bowl portion from a blank of metal material. Preferably the method comprises pressing out a bowl portion from a blank of aluminium.

The method preferably includes press-forming a plurality of first support members arranged, in use, to be located around the periphery of a first grill portion.

The method may include press-forming at least one second support member, arranged to be lower in the bowl portion than the first support members, which second support member is arranged to support a second grill portion, which is itself arranged, in use, to support portions of fuel or simulated fuel, such as is commonly known as "lava rock".

In a preferred arrangement the method comprises a method of manufacturing a gas barbecue in which at least one gas burner is arranged to be located in a base of the bowl portion to provide heat for cooking portions of food supported on the first grill portion.

The method may include pressing out a lid from a blank of material.

Preferably the method includes pressing out a lid using the same or similar press tools as are used to press out the bowl portion.

The method may include pressing out a bowl portion with press tools having supplementary portions which are not present in the press tools for pressing out the lid, thereby to produce a variation in the bowl portion.

In a preferred arrangement the method includes accommodating surplus material, formed at the corners of the pressing, into one or more channels. The method may include forming at least one of the support members in the bowl portion from a ridge in one of the channels.

Preferably the method includes pressing out at least one hole in the base of the bowl portion. The method may include pressing out at least one hole having a flange arranged to extend around the edge of the hole, and to project into the bowl. The method may include pressing out a drainage hole in the base of the bowl portion.

The invention also includes a method substantially as herein described with reference to the accompanying drawings.

The invention also includes a barbecue substantially as herein described with reference to the accompanying drawings.

The invention also includes a barbecue manufactured by a method substantially as herein described with reference to the accompanying drawings.

An embodiment of the present invention will now be described by way of example only with reference to the accompanying diagrammatic drawings in which:

FIG. 1 shows a barbecue unit according to an embodiment of the present invention, and FIG. 2 shows a cross-section through a bowl of the barbecue of FIG. 1.

Referring particularly to FIG. 1, a barbecue unit comprises a bowl 10, a lid 11 and a first grill 12, on which are arranged some portions 13 of food to be cooked.

The bowl 10 and lid 11 are pressed from sheets of steel using press tools (not shown). Surplus steel, which occurs at the corners of the bowl 10 and lid 11 during pressing, is accommodated in elongate channels 14 which project into the bowl 10 and lid 11, and which appear as recesses on the outside of the bowl 10 and lid 11.

FIG. 2 is a cross-sectional view of the bowl 10 of FIG. 1, taken along one of the channels 14 in the bowl 10. From FIG. 2 it can be seen that the channel 14 extends substantially all the way around the under surface of the bowl 10. The channel 14 is not of uniform depth all the way around the under surface of the bowl 10. Instead the depth of the channel 14 is increased at points 14a, 14b, 14c and 14d to form shoulders 15 which, in use, support the first grill 12 and a second grill 16 (not shown) which, in use, supports pieces of simulated solid fuel, such as "lava rock".

In the base of the bowl 10 is a gas-burner unit 17 to which gas is supplied by means of a gas supply pipe 18.

In use, gas supplied by the gas-supply pipe 18 is burned in the gas-burner 17 which causes pieces of simulated solid fuel (not shown) located on the second grill 16 to become hot and thereby to radiate heat, which heat cooks the portions 13 of food which are supported on the first grill 12. There is further provided a drainage hole 19 through which any fat or juices which have fallen from the portions 13 of food are allowed to drain. A further hole 20 in the base of the bowl 10, through which the gas-burner 17 projects is defined by an upwardly extending flange 20a, the purpose of which is to prevent fat or other juices from the portions 13 of food escaping from the bowl 10 via the hole 20. Other similar holes (not shown) are located in the base of the bowl 10 to provide ventilation for the gas burner 17.

The press-tools (not shown) used to produce the bowl 10 and lid 11 are identical except for the provisions of inserts (not shown) which are included in the press-tool when pressing out the bowl 10, but which are omitted when pressing-out the lid 11. The purpose of these inserts is to form the shoulders 15 in the bowl 10, but not in the lid 11 where they are not needed.

Around the periphery of the bowl 10 is a flange 21 which is covered by, and supports a complimentary flange (not shown) on the lid 11. When the lid 11 is closed the flange 21 is hidden from view by the flange (not shown) of the lid 11. Both flanges are formed during the pressing process.

The invention provides a barbecue unit which can be made quickly and relatively inexpensively as compared with conventional barbecue units of this kind which are typically made by casting processes. The provision of the shoulders 15 which are formed during the pressing process obviates the need for separate support members to be welded or otherwise attached to the inside surface of the bowl 10, thereby saving both time and production costs and avoiding unsightly spot-welding marks on the exterior of the bowl.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A barbecue comprising a bowl which in plan view has a plurality of corners, the bowl comprising a pressing and having a side wall;
   at least one first support member in the bowl, comprising material press-formed from said side wall to project from said side wall inwardly of the bowl, said at least one first support member being positioned between two of said corners, said corners being smooth, surplus material formed at said corners being accommodated by said first support member;
   and a first grill portion;
   said at least one first support member wall forming a support said first grill portion.

2. A barbecue according to claim 1, wherein the bowl is of metal.

3. A barbecue according to claim 1, wherein the bowl comprises a plurality of first support members located around the periphery of the at least one first grill portion.

4. A barbecue according to claim 1, further comprising at least one second support member for supporting a second grill portion.

5. A barbecue according to claim 4, wherein the second grill portion is arranged to support portions of fuel or simulated fuel.

6. A barbecue according to claim 1, wherein the barbecue is a gas barbecue, and wherein at least one gas burner is arranged to be located in a base of the bowl to provide heat for cooking portions of food supported on the first grill portion.

7. A barbecue according to claim 1, further comprising a lid means for covering the barbecue.

8. A barbecue according to claim 7, wherein the lid means comprises a pressed portion having surplus material formed at the corners thereof, said surplus material being accommodated in at least one channel in the pressed portion.

9. A barbecue according to claim 1, wherein at least one first support member of the bowl comprises at least one ridge formed in one of the channels.

10. A barbecue according to claim 1, wherein at least one second support member of the bowl comprises at least one ridge formed in one of the channels.

11. A method of manufacturing a barbecue having a bowl with a side wall and a first grill portion arranged to extend at least partly over the bowl, said method comprising the steps of:
    pressing the bowl out of a blank of material; and
    press-forming at least one first support member in the bowl, said at least one first support member being press-formed to support the first grill portion, said at least one first support member projecting from the side wall inwardly of the bowl, thereby forming a support for the first grill portion.

12. A method according to claim 11, wherein the method includes the steps of press-forming in the bowl at least one first support member to support the first grill portion at a location spaced from a base of the bowl.

13. A method according to claim 11, wherein the method comprises pressing out the bowl from a blank of metal material.

14. A method according to claim 11, wherein the method includes press-forming a plurality of first support members arranged in use to be located around the periphery of a first grill portion.

* * * * *